(12) United States Patent
Marzouki

(10) Patent No.: US 6,700,924 B1
(45) Date of Patent: Mar. 2, 2004

(54) SPREAD-SPECTRUM DATA TRANSMISSION APPARATUS COMPRISING A DATA RECEIVER

(75) Inventor: Abdelwaheb Marzouki, Le Mans (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 585 days.

(21) Appl. No.: 09/626,189

(22) Filed: Jul. 28, 2000

(30) Foreign Application Priority Data

Jul. 30, 1999 (FR) .......................................... 99 09925

(51) Int. Cl.$^7$ ................................................ H04B 1/69
(52) U.S. Cl. ...................................... 375/148; 375/150
(58) Field of Search ................................. 375/130, 140, 375/142, 143, 144, 150, 152, 148, 267, 347; 370/342; 455/132–137

(56) References Cited

U.S. PATENT DOCUMENTS

| | | | | | |
|---|---|---|---|---|---|
| 6,009,098 | A | * | 12/1999 | Asamizuya | 370/395.6 |
| 6,067,292 | A | * | 5/2000 | Huang et al. | 370/342 |
| 6,272,167 | B1 | * | 8/2001 | Ono | 375/144 |
| 6,414,949 | B1 | * | 7/2002 | Boulanger et al. | 370/335 |
| 6,496,534 | B1 | * | 12/2002 | Shimizu et al. | 375/148 |

FOREIGN PATENT DOCUMENTS

| | | | |
|---|---|---|---|
| EP | 0851600 A2 | 1/1998 | H04B/7/26 |
| WO | WO9705709 | 2/1997 | H04B/1/707 |

OTHER PUBLICATIONS

Park et al., "Antenna Array using a Channel Estimation Technique in a DS/CDMA System with M–ary Orthogonal Modulation," 2000 IEEE, pp. 759–763.*

Sawahashi et al., "Experiments on Pilot Symbol–Assisted Coherent Multistage Interference Canceller for DS–CDMA Mobile Radio," 2002, IEEE Journal on Selected Areas in Communications, vol. 2, pp 433–449.*

Su II Kim et al., "Performance improvement of RAKE receiver for Multicode DS–CDMA System with Multistage Interference Cancellation Detectors," 1999, IEEE TEN-CON, pp 573–576.*

BY R. PRICE & P.E. Green, Entitled: "A Ccmmunication-Technique For Mutipath Channels" Proceedings Of Ire, vol. 46, Mar. 1958, PP. 555–570.

* cited by examiner

*Primary Examiner*—Tesfaldet Bocure
(74) *Attorney, Agent, or Firm*—Michael E. Schmitt

(57) ABSTRACT

A spread spectrum data transmission apparatus, suitable for use in radiotelephony utilizing Code Division Multiple Access (CDMA), includes a receiver for receiving data organized in symbols having a duration $T_s$ These symbols are spread by a spreading code having a period $T_c$ prior to transmission over a transmission channel that has a plurality of main broadcasting paths, each broadcasting path producing a delay. The receiver includes a Rake receiving circuit having a plurality of branches for processing data relating to a path delay, an estimation circuit for received symbols, and an interference cancelling circuit having a long duration covering various $T_s$ and which is adapted to perform the following operations:

$$\sum_{k=1}^{k=K} d_{-k} \cdot \left( \sum_{l=1}^{l=L} w^*(\tau_1) \cdot w(\tau_1 - kT_s) \right)$$

where w( . . . ) represents a channel estimation, w*( . . . ) represents the conjugate of the channel estimation, and $d_{-k}$ represents previously estimated symbols.

7 Claims, 3 Drawing Sheets

SPREAD-SPECTRUM DATA TRANSMISSION APPARATUS COMPRISING A DATA RECEIVER

FIELD OF THE INVENTION

The present invention relates to a spread-spectrum data transmission apparatus comprising a data receiver for receiving data organized in symbols of duration $T_s$ and spread by means of a spreading code having period $T_c$ before a transmission channel is borrowed which channel has various broadcasting paths each producing delays, which receiver comprises:

- a receiving circuit called Rake circuit formed by <<L>>branches for processing data relating to a path delay,
- an estimation circuit for the received symbols.

The invention also relates to a method of processing data featuring a spectrum spreading.

BACKGROUND OF THE INVENTION

Such apparatus are well known and find many applications notably in the field of portable telephones. On this subject European patent EP 0-851 600 can be consulted. This known apparatus comprises a receiver, which combines signals delayed by one symbol period or more, with the aim to diminish the influence of interference which occurs in time periods that exceed this symbol period.

SUMMARY OF THE INVENTION

The present invention also proposes to eliminate the interference which occurs in periods which exceed various times this symbol period but by utilizing other methods.

For this purpose, such a receiver is characterized in that it further includes a long-duration interference canceling circuit which covers various $T_s$.

These and other aspects of the invention are apparent from and will be elucidated, by way of non-limitative example, with reference to the embodiment(s) described hereinafter.

DESCRIPTION OF PREFERRED EMBODIMENTS

Figure 1:
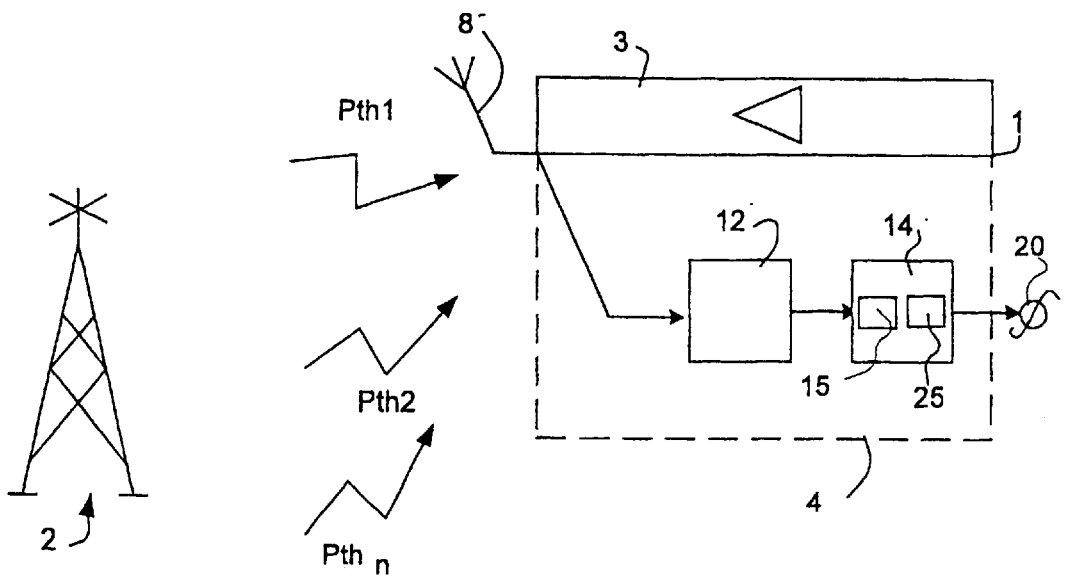
FIG. 1 shows a receiver in accordance with the invention.

In FIG. 1 is represented a transmission apparatus 1 co-operating with a base station 2 which transmits, while using QPSK modulation (Quadrature Phase Shift Keying), data in complex form according to the CDMA method. This apparatus is in the form of a data transmitter 3 and a data receiver 4, which use an antenna 8 in common.

The receiver 4 notably comprises a demodulator 12, which demodulates the data received from the antenna 8 after processing them, and a data processing element 14, which incorporates a Rake receiving circuit referenced 15. This circuit permits to improve the reception for radio links which take place over various paths Pth1, Pth2, . . . , Pth$_n$, so that the data d$_{-k}$, which are available at terminal 20, are of the best possible quality.

According to the invention an interference canceling circuit referenced 25 is further provided in this receiver.

Figure 2:
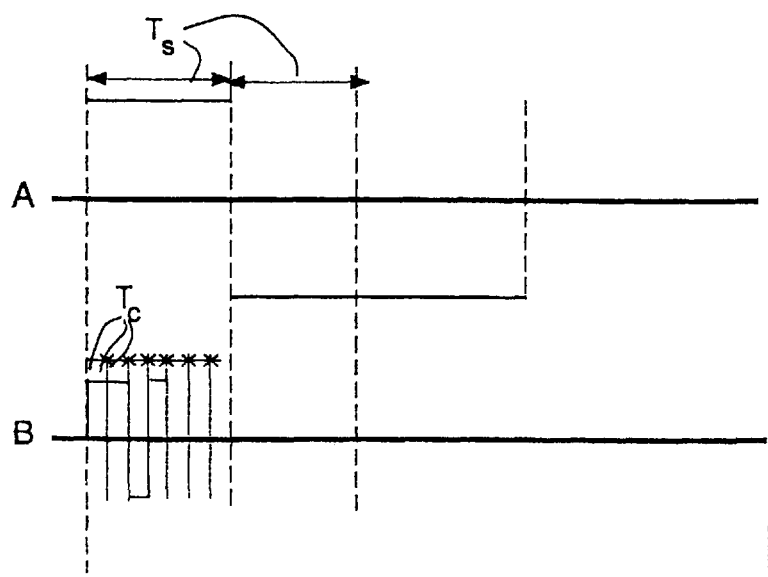
FIG. 2 is a timing diagram explaining the symbol periods and the duration of the spreading element.

In FIG. 2 the line A shows a symbol to be transmitted, which is represented in two states to make matters easier. $T_s$, is the duration of this symbol. This symbol is subjected to a modulation via a spread-spectrum code of which each element has a duration $T_C$. The ratio $T_S/T_C$ provides the spread-spectrum factor. This spreading code is in fact in the form of a first code $C_{SP}$ relating to the user, and a second code $C_{SC}$ relating to the base station that transmits the code. Thus the composite spreading code permits to find back, by means of correlations, the symbols transmitted at the level of the receiver.

Figure 3:
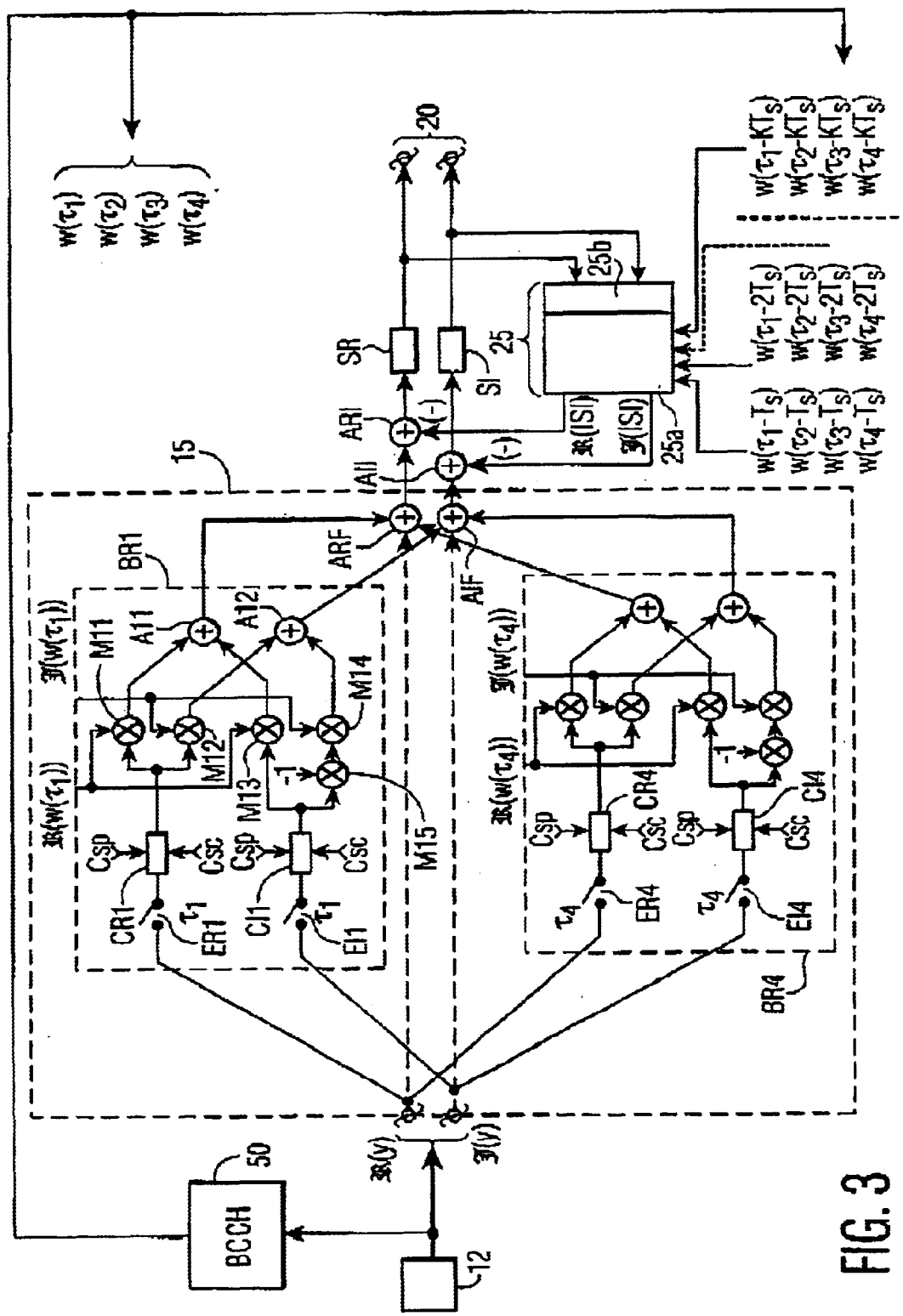
FIG. 3 shows in more detail the receiver in accordance with the invention.

FIG. 3 shows in more detail the receiver according to the invention. It is in the form of a Rake receiving circuit 15 which receives a complex signal y(t) formed by four branches, for example BR1 to BR4, for processing the signals coming from various paths leading to respective delays $\tau_1$ to $\tau_4$. These branches comprise a sampler ER1 to ER4 respectively, which samples the real part $\Re(y)$ of the received signal at the frequency $1/T_C$ and another sampler EI1 to EI4 for the imaginary part $\Im(y)$ of this signal. The sampling time of these various samplers is shifted by the periods $\tau_1$ to $\tau_4$ for each of the branches. A corrector CR1 to CR4 provides the correlation of the real part of the sampled signal via the various samplers ER1 to ER4 with the spread-spectrum code formed from the locally processed parts $C_{SP}$ and $C_{SC}$. A corrector CI1 to CI4 provides these same correlations for the imaginary parts of this received signal. The signal on the output of this corrector is corrected by the estimate of the channel used. This estimate based on the processing of the channel impulse response is effected by a channel estimator 50. This type of estimator forms part of the state of the art and one may find a description thereof in the article by R. PRICE and P. E. GREEN, entitled: "A Communication Technique for Multipath Channels", published in Proceedings of IRE, vol. 46, March 1958. Notably this estimate is processed based on a channel called BCCH (see UMTS standards). Various multipliers M11, M12, M13, M14 and M15 (the latter by its multiplication by –1 gives the conjugate part of the output signal of the set of correlators CR1 and CI1), which makes it possible to modify the amplitude and the phase of the output signals of the correlators CR1 and CI1; it will be the same for the other branches. The adders A11 and A12 finally produce the corrected signal. The adders ARF and AIF produce the combination of the signals processed by the various branches of the circuit.

In accordance with the invention, before applying these signals to the decision circuits SR and SI, the contribution of the interference, which is evaluated by the interference canceling circuit 25, is subtracted by means of the adders ARI and AII.

This circuit 25 comprises a part 25a relating to the calculations and a part 25b intended to store the various data estimated by the decision circuits SR and SI, which thus form an estimation circuit for symbols received and rendered available at terminal 20. The calculation circuits thus use these various stored data and also various estimation samples of the channel produced by the estimator 50.

Figure 4:
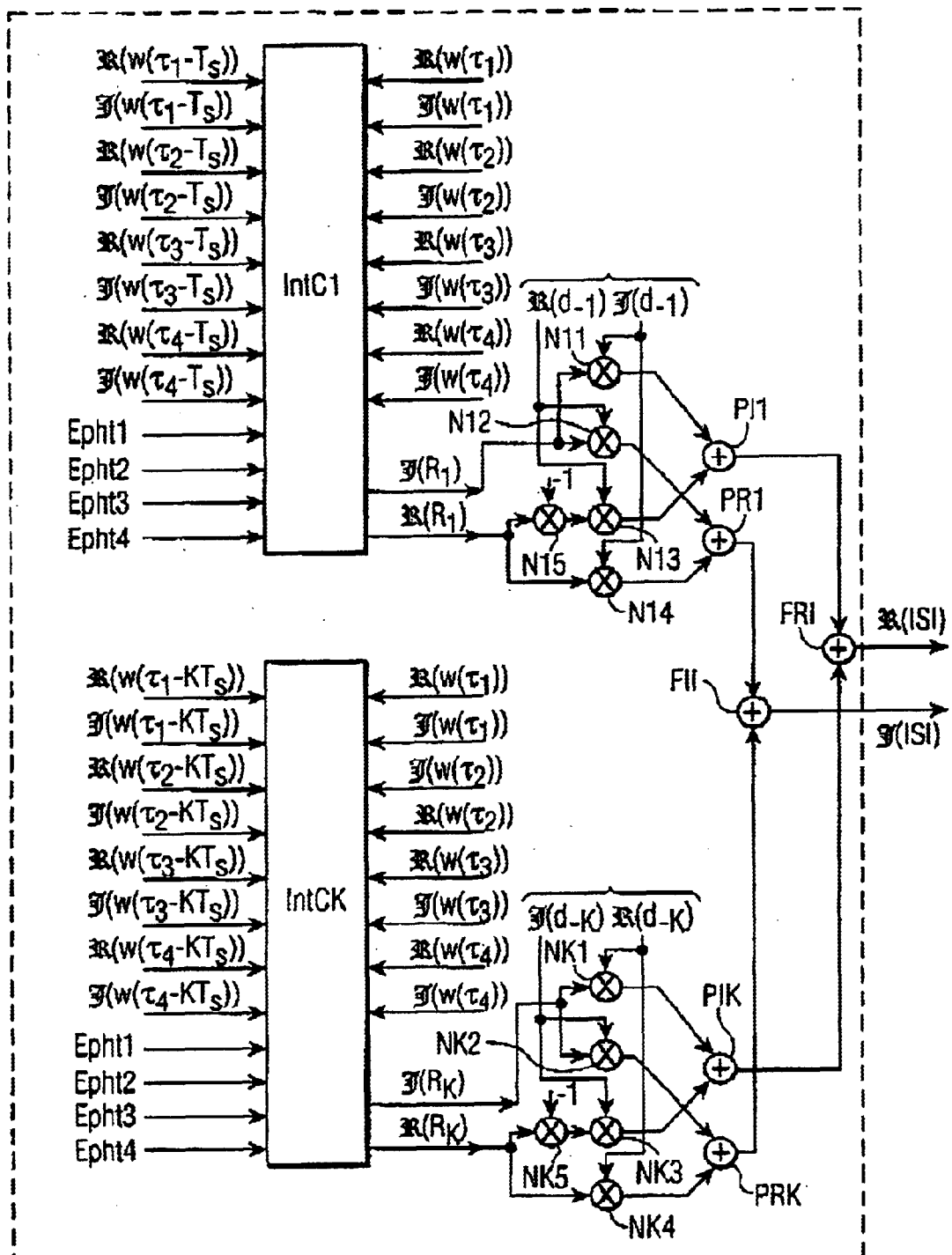
FIG. 4 shows in detail the structure of the interference canceling circuit included in the receiver shown in FIG. 3.

FIG. 4 shows the structure of the canceling circuit 25. This circuit is in the form of K intercorrelation blocks IntC1 to IntCK, where K defines the time during which the interference may be suppressed. These blocks receive signals Epth1 to Epth4 which either or not validate the contribution of the branches BR1 to BR4 assigned to the paths Pth1 to Pth4. Various multipliers N11 to N15 for the block IntC1, in co-operation with the adders PR1 to PI1, perform similar operations to the preceding operations, but which operations relate to the decided data $d_{-1}$ up to $d_{-k}$ for the block IntCK. Two adders FRI and FII combine the contribution of all the blocks to produce the calculated interference signals $\Re(ISI)$ and $\Re(ISI)$.

The various calculations performed by these blocks will be explained with the following considerations:

In the communications in which radio broadcasting is used, the transmission channel is split up into L paths each bringing about on the one hand a delay of $\tau_1$ and, on the other hand, a phase rotation $\phi_1$ and an amplitude attenuation $\beta_1$, so that the received signal y(t) coming from a transmitted signal s(t) will take these various disturbances and also the noise n(t) into account and will thus be written as:

$$y(t) = \sum_{l=1}^{L} \beta_1 \cdot e^{j\varphi_1} s(t - \tau_1) + n(t) \tag{1}$$

The signal s(t) represents data $d_k$ which undergo a spreading defined by a spreading code $C(t-k.T_s)$, where $T_s$ represents the duration of the transmitted symbol. This code is formed by values $C_j$, so that there may be written:

$$C(t) = \sum_{j=0}^{j=K-1} C_j \delta(t - jT_c) \tag{4}$$

where $T_c$ represents the duration of the spreading code element and K the number of these spreading code elements. One may also write: $T_s = KT_c$. The signal x(t) can then be written as:

$$y(t) = \sum_{l=1}^{L} \beta_1 \cdot e^{j\varphi_1} \cdot \sum_{k=-\infty}^{k=+\infty} d_{-k} \cdot C(t - \tau_1 - kT_S) + n(t) \tag{5}$$

Each branch of the Rake receiver effects a correlation, the output signal $r(\tau_1)$ of these branches is then written as:

$$r(\tau_1) = \sum_{k=-\infty}^{k=+\infty} d_{-k} \cdot w(\tau_1 - kT_S) + \eta(\tau_1) \tag{6}$$

$w(\tau_1+kT_s)$ is the channel impulse response at the time indicated in parentheses. This signal is split up into two parts: a useful signal $r_{us}$, and a train signal $r_{ps}$, which can be written as:

$$r_{us}(\tau_1) = d_0 \cdot w(\tau_1) \tag{7a}$$

$$r_{ps}(\tau_1) = \sum_{k \neq 0} d_k w(\tau_1 + kT_s) \tag{7b}$$

As the delays $\tau_1$ are chosen in the time interval $[0, T_s]$, which thus implies that only the passed symbols will be taken into account, the equation (6) is rewritten as:

$$r(\tau_1) = \sum_{k=0}^{k=K} d_{-k} \cdot w(\tau_1 - kT_S) + \eta(\tau_1) \tag{9}$$

K is chosen such that $KT_c \leq \tau_L$, $\tau_L$ represents the longest time which in fact is not fixed, because it depends on the physical environment. It may just be said that one may vary from a fraction of a symbol to various symbols.

According to certain standards (notably UMTS) $\tau_L$ is supposed to be equal to 256 $T_C$, whence the factor K:

$$K = \frac{256 \cdot T_C}{SF \cdot TC} = \frac{256}{SF} \tag{10}$$

SF is the spreading factor that may be taken from the range running from 4 to 256. It should be noted that the duration of one symbol $T_s$ for the information, which is not known a priori, may vary from 4 to 256 SF and that the duration of one symbol of a control channel, which is used for estimating the delays due to the paths, is fixed (it is equal to 256 in the case of UMTS and 128 in the case of IS95).

Based on the formula (9), the part r'(t) free from interference caused by already transmitted data may be evoked.

$$r^1(t) = r(\tau_1) - \sum_{k=0}^{k=K} d_k \cdot w(\tau_1 - kT_S) += d_0 w(\tau_1) + \eta(\tau_1) \tag{11}$$

$d_0$ is the symbol one wishes to estimate and $d_{-1}, d_{-2}, \ldots d_{-k}$ are already estimated passed symbols.

The signal Z at the output of the adders ARI and AII, which results from the combination of the various branches of the Rake receiver and of the circuit 25, is written as:

$$Z = \sum_{l=1}^{l=L} w^*(\tau_1) \cdot r(\tau_1) - \sum_{k=1}^{k=K} d_{-k} \cdot \left( \sum_{l=1}^{l=L} w^*(\tau_1) \cdot w(\tau_1 - kT_s) \right) \tag{12}$$

$$Z = \sum_{l=1}^{l=L} w^*(\tau_1) \cdot r(\tau_1) - \sum_{k=1}^{k=K} d_{-k} \cdot R_k \tag{13}$$

where $$R_k = \sum_{l=1}^{l=L} w^*(\tau_1) \cdot w(\tau_1 - kT_s) \tag{14}$$

The blocks IntCK perform the calculations indicated by this formula (14).

The various multipliers N11, ..., N15 up to NK1, ..., NK5 perform the operations situated after the minus sign of the equation (11). This formula (14) shows that an intercorrelation of the channel impulse response limited to $[0, T_s]$ and of the impulse response outside this interval $(0, T_s)$ is effected.

What is claimed is:

1. A spread-spectrum data transmission apparatus comprising a data receiver for receiving data organized in symbols of duration $T_s$ and spread by means of a spreading code having period $T_c$ before transmission on a transmission channel the channel having various broadcasting paths each producing delays, which receiver comprises:

a Rake receiving circuit having L branches for processing data relating to a path delay;

an estimation circuit for the received symbols; and
a long-duration interference canceling circuit which covers various $T_s$;
wherein L is an integer number, and wherein the long-duration interference canceling circuit is adapted to effect an intercorrelation of a channel impulse response limited to $[0, T_s]$ and of an impulse response outside of the interval $[0, T_s]$.

2. The apparatus as claimed in claim 1, characterized in that the interference canceling circuit has inputs for receiving:
the number L;
the spreading factor: $T_s/T_c$;
estimation coefficients of the transmission channel w( . . . ) produced by a channel estimator;
a number K, of already estimated symbols; and an output for suppressing the estimated interference at the input of the estimation circuit.

3. An apparatus as claimed in claim 2, characterized in that the canceling circuit performs the following operations:

$$\sum_{k=1}^{k=K} d_{-k} \cdot \left( \sum_{l=1}^{l=L} w^*(\tau_1) \cdot w(\tau_1 - kT_s) \right)$$

where w( . . . ) represents said channel estimation and w*( . . . ) its conjugate, $d_{-k}$ are the already estimated symbols.

4. An apparatus as claimed in claim 3, characterized in that the channel estimator acts on information coming from a channel called BCCH.

5. A method implemented in a receiver in accordance with claim 1, characterized in that there is effected:
a reception of the signals by means of a Rake receiver,
an estimation of the broadcast channel from the signals received,
a decision for producing decided symbols from the signal received,
a storage of the decided symbols, and
a cancellation of the interference for a duration that may exceed symbol durations, interference calculated via intercorrelations effected with respect to the channel estimation and to the decided symbols.

6. A method of operating a receiver, comprising:
receiving signal by means of a Rake receiver;
estimating a channel by processing a channel impulse response;
producing decided symbols from the signal received by means of the Rake receiver; and
performing a long-duration interference cancellation including performing an intercorrelation of a channel impulse response limited to $[0, T_s]$ and of an impulse response outside of the interval $[0, T_s]$.

7. The method of claim 6, further comprising performing the following operations:

$$\sum_{k=1}^{k=K} d_{-k} \cdot \left( \sum_{l=1}^{l=L} w^*(\tau_1) \cdot w(\tau_1 - kT_s) \right)$$

where w( . . . ) represents the channel estimation, w*( . . . ) represents the conjugate of the channel estimation, and $d_{-k}$ represents one of a plurality of previously estimated symbols.

* * * * *